United States Patent
Cariou et al.

(10) Patent No.: US 10,129,876 B2
(45) Date of Patent: Nov. 13, 2018

(54) SPATIAL REUSE TRAINING FOR CHANNEL ACCESS SCHEMES

(71) Applicant: Intel IP Corporation, Santa Clara, CA (US)

(72) Inventors: Laurent Cariou, Portland, OR (US); Ou Yang, Santa Clara, CA (US); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 92 days.

(21) Appl. No.: 15/282,522

(22) Filed: Sep. 30, 2016

(65) Prior Publication Data

US 2017/0325222 A1    Nov. 9, 2017

Related U.S. Application Data

(60) Provisional application No. 62/331,593, filed on May 4, 2016.

(51) Int. Cl.
*H04W 72/04* (2009.01)
*H04L 12/26* (2006.01)

(52) U.S. Cl.
CPC ......... *H04W 72/0446* (2013.01); *H04L 43/16* (2013.01)

(58) Field of Classification Search
None
See application file for complete search history.

(56) References Cited

U.S. PATENT DOCUMENTS

2005/0141545 A1* 6/2005 Fein .............. H04B 7/0617
                                                        370/445
2008/0031172 A1* 2/2008 Nanda ............ H04W 72/0426
                                                       370/310.1

(Continued)

*Primary Examiner* — Ayaz R Sheikh
*Assistant Examiner* — Tarell A Hampton
(74) *Attorney, Agent, or Firm* — Eversheds Sutherland (US) LLP

(57) ABSTRACT

This disclosure describes methods, apparatuses, and systems related to network allocation vectors. A device is disclosed that may determine a first length of time corresponding to a first spatial reuse transmit opportunity (SR-TxOP) time period. The device may determine a second length of time corresponding to a transmit opportunity (TxOP) time period that starts when a request to send (RTS) frame is transmitted and ends after the first length of time ends. The device may cause to transmit the RTS frame, over the channel, to a first device. The device may determine that a clear to send (CTS) frame is received from the first device, the CTS frame comprising a first duration field equal to having a third length of time corresponding to a second transmission opportunity (SR-TxOP). The device may determine that the third length of time corresponds to a length of time between when the CTS frame was transmitted and when the first length of time ends. The device may determine that the third length of time is less than the second length of time. The device may cause to transmit a CTS to self frame, over the channel, comprising a second duration field equal to having a fourth length of time, wherein the fourth length of time corresponds to a length of time between when the CTS to self frame is transmitted and when the first length of time ends.

20 Claims, 8 Drawing Sheets

(56) References Cited

U.S. PATENT DOCUMENTS

| | | | |
|---|---|---|---|
| 2008/0031221 A1* | 2/2008 | Nanda | H04J 3/14 |
| | | | 370/350 |
| 2008/0031222 A1* | 2/2008 | Nanda | H04W 72/02 |
| | | | 370/350 |
| 2008/0031223 A1* | 2/2008 | Nanda | H04W 72/0426 |
| | | | 370/350 |
| 2008/0031224 A1* | 2/2008 | Nanda | H04W 72/0426 |
| | | | 370/350 |
| 2008/0153502 A1* | 6/2008 | Park | H04W 8/005 |
| | | | 455/446 |
| 2011/0222408 A1* | 9/2011 | Kasslin | H04L 41/083 |
| | | | 370/241 |
| 2013/0051256 A1* | 2/2013 | Ong | H04W 72/042 |
| | | | 370/252 |
| 2015/0063251 A1* | 3/2015 | Asterjadhi | H04W 74/04 |
| | | | 370/329 |
| 2015/0117365 A1* | 4/2015 | Merlin | H04W 24/10 |
| | | | 370/329 |
| 2015/0117369 A1* | 4/2015 | Merlin | H04W 74/0816 |
| | | | 370/329 |
| 2016/0029389 A1* | 1/2016 | Merlin | H04J 1/14 |
| | | | 370/330 |
| 2016/0128130 A1* | 5/2016 | Sadek | H04B 17/309 |
| | | | 370/328 |
| 2016/0255656 A1* | 9/2016 | Lou | H04L 1/0026 |
| | | | 370/335 |
| 2016/0270120 A1* | 9/2016 | Kronander | H04W 74/08 |
| 2017/0064739 A1* | 3/2017 | Hedayat | H04W 74/0816 |
| 2017/0078891 A1* | 3/2017 | Cariou | H04W 16/14 |
| 2017/0127448 A1* | 5/2017 | Zhou | H04W 74/0816 |

* cited by examiner

US 10,129,876 B2

SPATIAL REUSE TRAINING FOR CHANNEL ACCESS SCHEMES

CROSS-REFERENCE TO RELATED APPLICATIONS

This application claims the benefit of U.S. Provisional Application No. 62/331,593 filed May 4, 2016, the disclosures of which is incorporated herein by reference in its entirety.

TECHNICAL FIELD

This disclosure generally relates to systems and methods for wireless communications and, more particularly, enhancing the performance of wireless devices utilizing channel access schemes.

BACKGROUND

Wireless devices, such as mobile phones, personal data assistants, laptops, desktop computers, and the access points that connect these wireless devices to the internet must have ways of scheduling when to send and receive packets to the wireless devices so that packets for one device do not collide with packets for another device. Novel collision avoidance techniques leveraging a combination of beamforming and channel access schemes must be used in order to prevent packets from colliding.

DETAILED DESCRIPTION

Example embodiments described herein provide certain systems, methods, and devices, for establishing a spatial reuse channel between wireless devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Currently, wireless devices implementing the IEEE 802.11 wireless fidelity (Wi-Fi) standard may reuse channels to communicate with different groups of devices without any interference. That is a first set of devices may use a first channel to communicate among one another on a first link, and a second set of devices may reuse the first channel to communicate among one another on a second link. The first channel may be reused by the second set of devices using one or more beamforming techniques to minimize the amount of interference experienced by the first set of devices simultaneously communicating on the first channel. However sometimes, one or more devices in the second set of devices may not be configured to reuse the first channel during a spatial reuse period, and will continue to communicate with the other devices in the second set of devices, but may use the first channel or another channel to communicate with the devices in the second set of devices. Because the one or more devices in the second set of devices may not be configured to reuse the first channel during the spatial reuse period, one or more timers or network allocation vectors (NAVs) must be set by the one or more devices to ensure that the one or more devices transmit and receive frames to the devices, in the second set, that are configured to reuse the first channel during the spatial reuse period. The methods disclosed herein describe one or more ways to set the timers (NAVs) to enable devices that are configured to reuse the first channel, and devices that are not configured to reuse the channel to communicate without interfering with the transmissions by the first set of devices.

Figure 1:
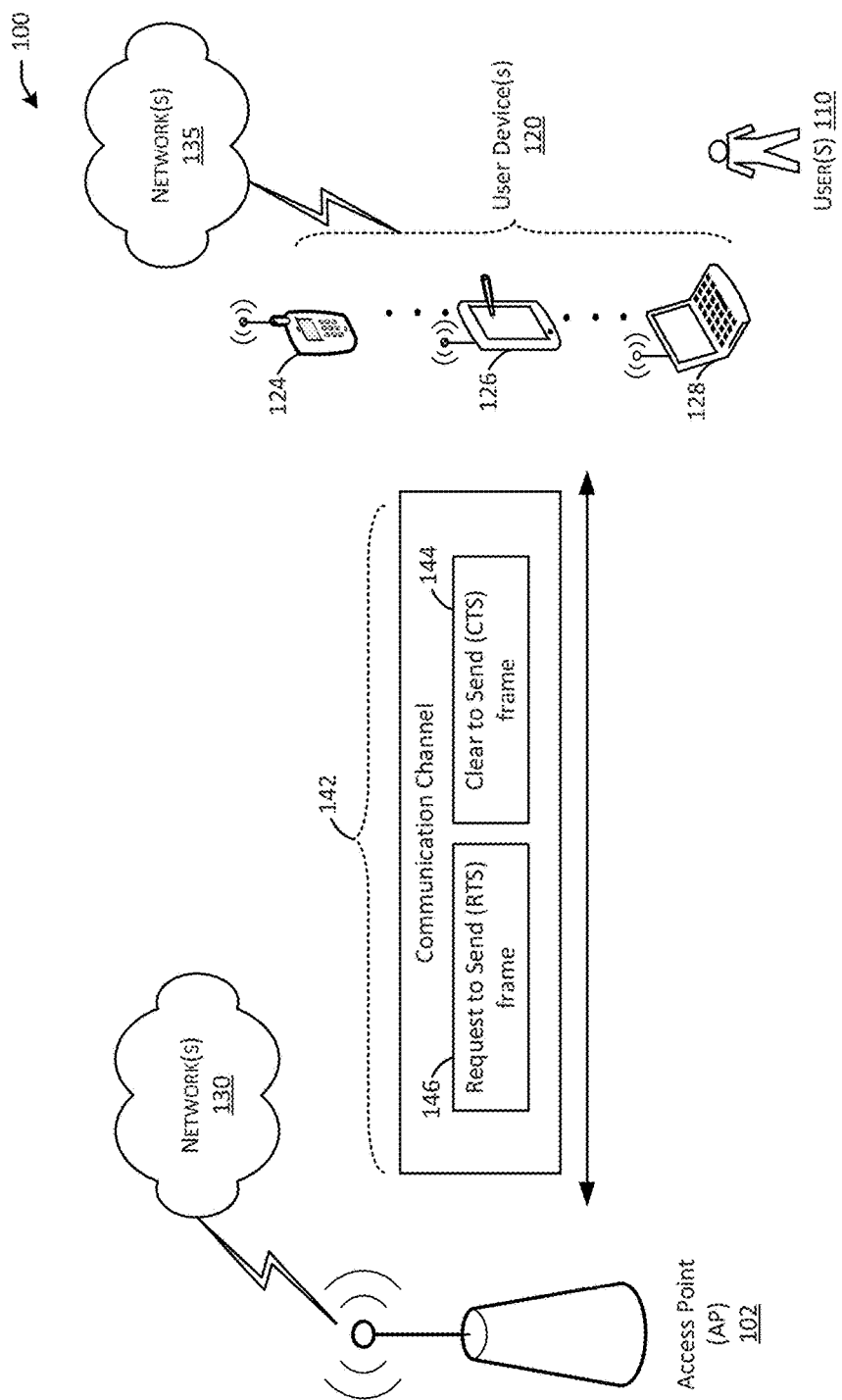
FIG. 1 depicts a network diagram illustrating an example network environment, according to some example embodiments of the present disclosure, according to one or more example embodiments of the disclosure.

FIG. 1 is a network diagram illustrating an example network environment, according to some example embodiments of the present disclosure. Wireless network 100 may include one or more devices 120 and one or more access point(s) (AP) 102, which may communicate in accordance with IEEE 802.11 communication standards, including IEEE 802.11ax. The device(s) 120 may be mobile devices that are non-stationary and do not have fixed locations.

Figure 7:
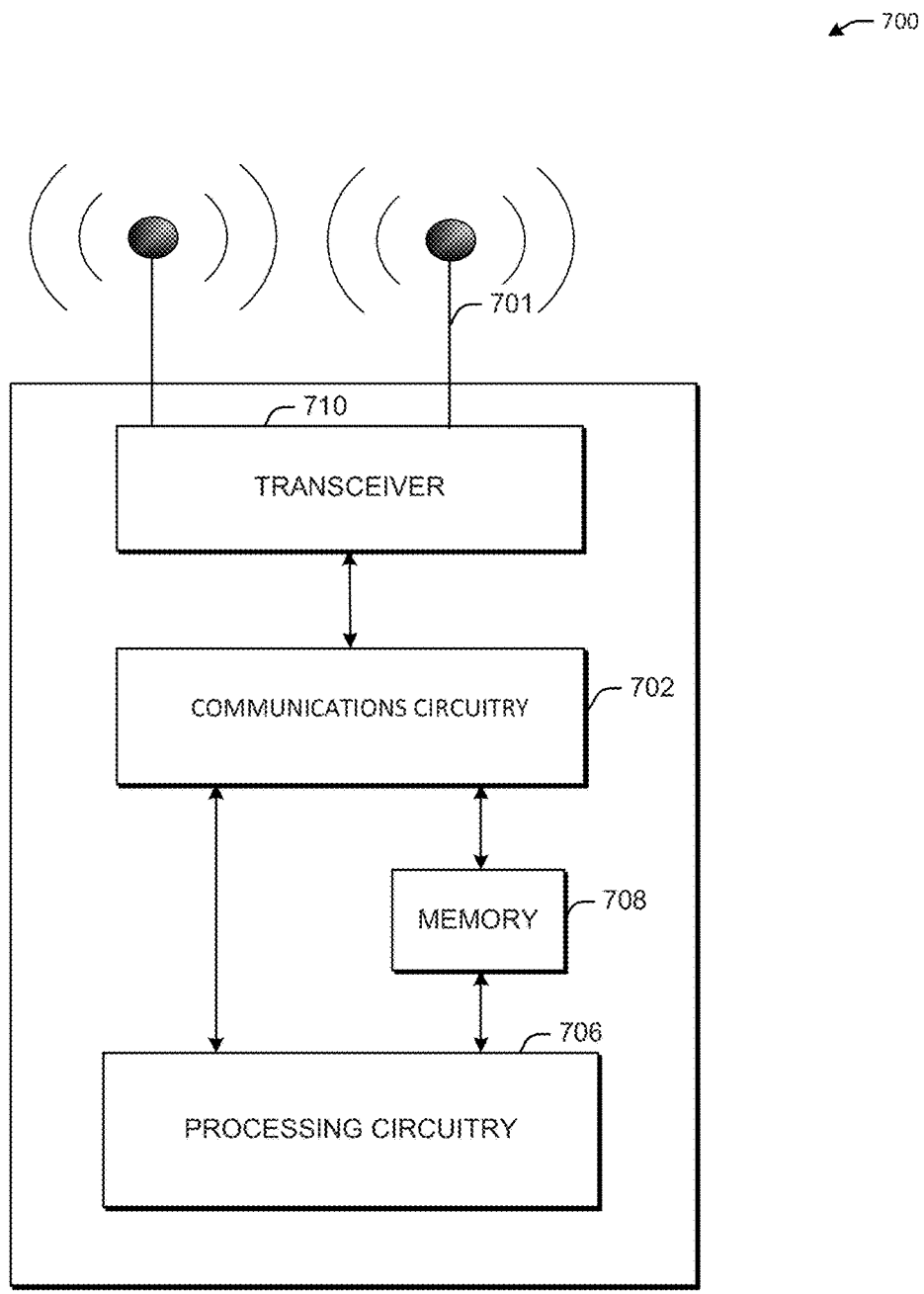
FIG. 7 illustrates a functional diagram of an example communication station that may be suitable for use as a user device, in accordance with one or more example embodiments of the disclosure.
Figure 8:
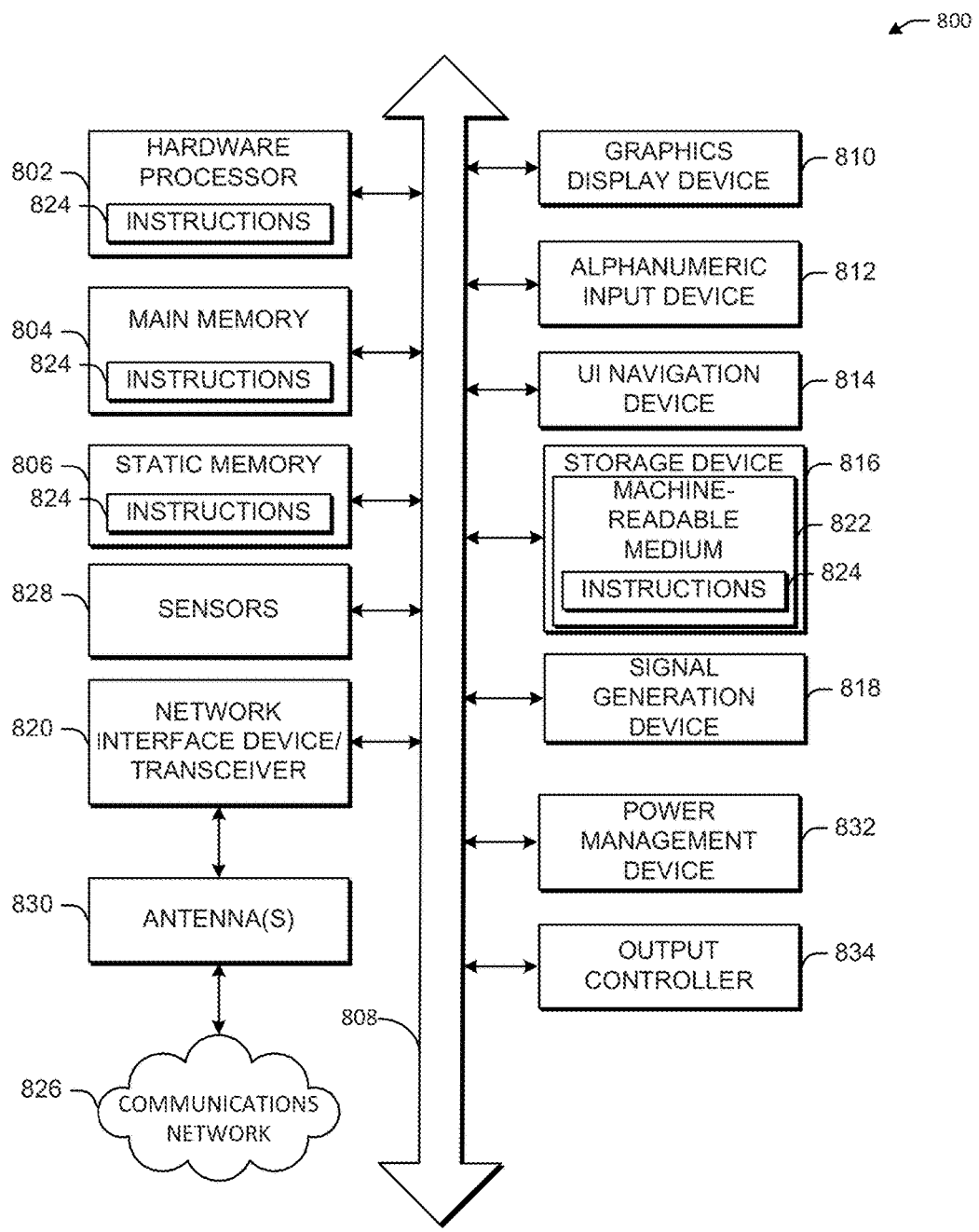
FIG. 8 is a block diagram of an example machine upon which any of one or more techniques (for example, methods) may be performed, in accordance with one or more embodiments of the disclosure.

In some embodiments, the user devices 120 and AP 102 may include one or more computer systems similar to that of the functional diagram of FIG. 7 and/or the example machine/system of FIG. 8.

One or more illustrative user device(s) 120 may be operable by one or more user(s) 110. The user device(s) 120 (for example, 124, 126, or 128) may include any suitable processor-driven user device including, but not limited to, a desktop user device, a laptop user device, a server, a router, a switch, an access point, a smartphone, a tablet, wearable wireless device (for example, bracelet, watch, glasses, ring, etc.) and so forth.

Any of the user device(s) 120 (for example, user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (for example, the Internet), private networks, wireless networks, cellular networks, or any other suitable private and/or public networks. Further, any of the communications networks 130 and/or 135 may have any suitable communication range associated therewith and may include, for example, global networks (for example, the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (for example, user devices 124, 126, 128), and AP 102 may include one or more communications antennae. Communications antenna may be any suitable type of antenna corresponding to the communications protocols used by the user device(s) 120 (for example, user devices 124, 126 and 128) and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (for example, user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (for example 802.11b, 802.11g, 802.11n), 5 GHz channels (for example 802.11n, 802.11ac), or 60 GHZ channels (for example 802.11ad). In some embodiments, non-Wi-Fi protocols may be used for communications between devices, such as Bluetooth, dedicated short-range communication (DSRC), Ultra-High Frequency (UHF) (for example IEEE 802.11af, IEEE 802.22), white band frequency (for example, white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (for example, AP 102) establishes communication with one or more user devices 120 (for example, user devices 124, 126, and/or 128), the AP may communicate in the downlink direction by sending data frames. The data frames may be preceded by one or more preambles that may be part of one or more headers. These preambles may be used to allow the user device to detect a new incoming data frame from the AP. A preamble may be a signal used in network communications to synchronize transmission timing between two or more devices (for example, between the APs and user devices).

In one embodiment, and with reference to FIG. 1, a communication channel 142 may be used by AP 102 and user devices 120 to send and receive Request to Send (RTS) frame 146 and/or Clear to Send (CTS) frame 144. RTS frame 146 may comprise one or more fields including, but not limited to, a frame control field, duration field, receiver address field, transmitter address field, frame check sequence (FCS) field. CTS frame 144 may comprise one or more fields including, but not limited to, a frame control field, duration field, receiver address field, and FCS field.

The frame control field may comprise control data that may be used by a transmitting device to define the type of medium access control (MAC) frame (for example, RTS frame 146 and/or CTS frame 144) being transmitted and may also comprise data about the one or more fields following the frame control field that may be used by a receiving device to understand how to process the MAC frame. The frame control field may comprise one or more subfields including a protocol version subfield comprising data indicating the current version of the protocol being used to transmit and receive the MAC frame (for example, the IEEE 802.11 standard being used). Receiving devices may use this value to determine if the version of the protocol of the received frame can be processed. The frame control field may comprise a type and subtype subfield. The type and subtype subfield may comprise data that may be used to determine the function of the frame. In some embodiments there may be three different frame type fields including a control frame type field, data frame type field, and management frame type field. There may be multiple subtype fields for each frame type. Each subtype may determine the specific function to perform for its associated frame type. The frame control field may comprise a distributed system (DS) and from a DS subfield that may comprise data that may be used by the transmitting device to indicate to receiving devices of the frame whether the frame is destined for a DS or coming from a DS respectively. The frame control field may comprise a more fragments subfield that may comprise data that may be used to indicate to a device receiving the frame whether there are remaining fragments (for example, data fragments and/or management fragments) of the frame following the frame control field. The frame control field may comprise a retry subfield that may comprise data indicating whether or not the frame, for either data or management frame types, is being retransmitted. The frame control field may comprise a power management subfield comprising data indicating whether the device transmitting the frame is in an active mode or a power-save mode. The frame control field may comprise a more data subfield that may comprise data indicating to a device receiving the frame, and that is in power-save mode that the device transmitting the frame has additional frames to transmit to the device receiving the frame. The more data subfield may also comprise data indicating that additional broadcast and/or multicast frames may follow the control frame. The frame control field may comprise a wired equivalent privacy (WEP) subfield that may comprise data indicating whether or not encryption and authentication is used to within the frame. The WEP subfield may be set for all data frame and management frames, which have the subtype subfield, mentioned above, set to authentication. The frame control field may comprise another subfield comprising data indicating that all received data frames must be processed in a specific order. In some embodiments, the order may be first come first processed, or may be based on sequence numbers indicating the sequence with which the frames were transmitted and therefore the sequence with which they should be processed when received.

The duration field may also be referred to as an identification (ID) field and may comprise data indicating the remaining duration needed to receive a next transmission frame. For example, the duration field may comprise one or more bits corresponding to the number of microseconds needed for a receiving device to process the next transmission frame.

The receiver address field may comprise data indicating the MAC address of the next hop device that the frame is to be delivered to. In particular, if the frame is to be routed over one or more devices between the transmitting device and the receiving device, then the receiver address field may be updated at each of the one or more devices to indicate the MAC address of the next one or more devices that the frame will be transmitted to in order to have the frame routed to its final destination. However, the receiver address field in a RTS frame may correspond to the destination MAC address of the frame because the device transmitting the RTS frame is within range of the device receiving the RTS frame.

The transmitter address field may comprise data indicating the MAC address of the device transmitting the frame.

The FCS field may comprise data that corresponds to a calculation of a cyclic redundancy check (CRC) over at least one field included in a MAC header and frame body field of the frame. The device transmitting the frame may calculate the CRC and may transmit it in the FCS field, and the device receiving the frame may calculate the CRC over the at least one field included in the MAC header and frame body field of the frame, and compare it to the CRC in the FCS field to determine whether any errors occurred during transmission of the frame.

Referring back to FIG. 1, RTS frame 146 may be transmitted by AP 102 to user device 128, with the frame control field type set to control frame, to indicate that AP 102 needs to transmit one or more frames to a user device, such as user device 128. If user device 128 is busy processing a frame, then receiving a frame from another device, or if scheduled to receive a frame from another device, that may collide with one or more frames that AP 102 needs to transmit to user device 128, may result in user device 128 not responding to RTS frame 146. If user device 128 is not busy processing a frame, receiving a frame from another device, or scheduled to receive a frame from another device, that may collide with one or more frames AP 102 needs to transmit to user device 128, then user device 128 may respond by transmitting CTS frame 144 to AP 102 instructing AP 102 to transmit the one or more frames. After the AP 102 receives CTS frame 144, AP 102 may transmit the one or more frames to user device 128.

Figure 2:
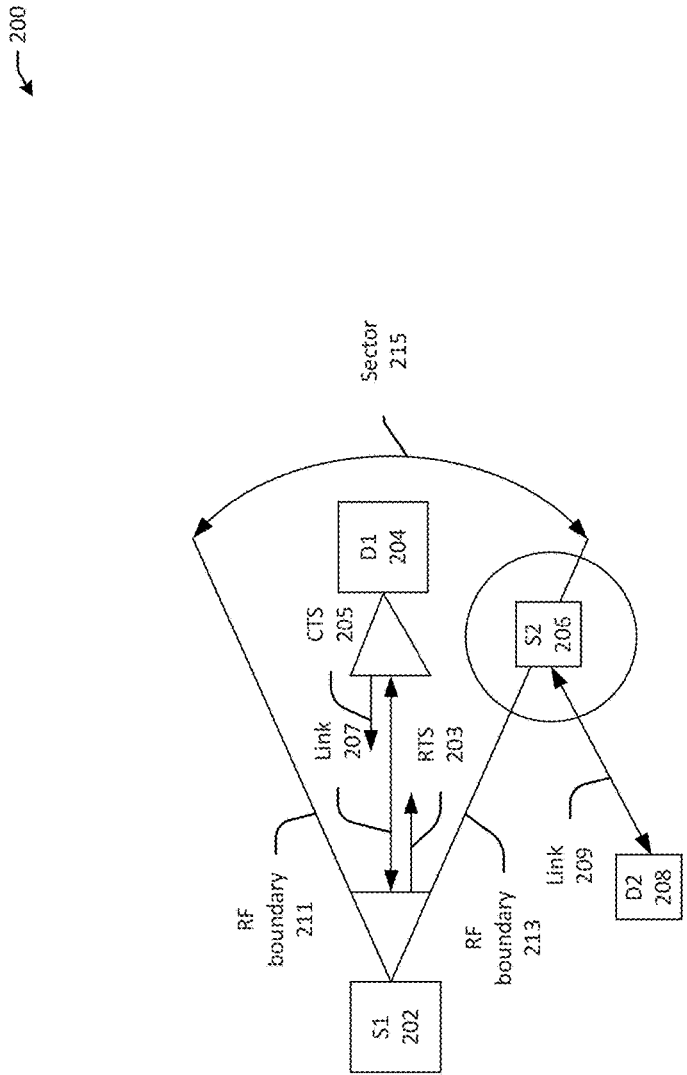
FIG. 2 depicts an illustrative channel access diagram, in accordance with one or more example embodiments of the present disclosure.

FIG. 2 depicts an illustrative channel access diagram, in accordance with one or more example embodiments of the present disclosure. One or more devices may transmit RTS and/or CTS frames on a first designated channel to establish a logical link (for example, Link 207) between the one or more devices. For example, S1 202 (for example, AP 102) may have one or more frames to transmit to D1 204 (for example, user device 128) once a logical link between S1 202 and D1 204. S1 202 may accomplish this via a series of channel training frames, to determine (estimate) a channel state between S1 202 and D1 204, and to establish timing parameters (for example, network allocation vectors (NAV) and/or clear channel assessment (CCA) parameters), based on the estimate of the channel state, that enable a MAC processor, and/or application specific integrated circuit (ASIC), in S1 202 to establish the logical link (for example, Link 207) between S1 202 and D1 204. For example, S1 202 may transmit RTS 203 to D1 204, and after D1 204 transmits CTS 205 in response to RTS 203, then Link 207 may be established over a first designated channel. The channel may be decided based on the estimate of the channel state. For example, S1 202 and/or D1 204 may determine that one or more frequencies may contribute to adverse channel fading when frames are transmitted between S1 202 and D1 204, and therefore may select at least one frequency that contributes to advantageous channel fading that minimizes the number of decoding errors that S1 202 or D1 204 may experience when a frame is transmitted across Link 207.

When S1 202 transmits a frame (for example, a control frame such as RTS 203 and/or a data frame) the radio frequency (RF) electromagnetic wave may be within an azimuth boundary (RF boundary 211 and RF boundary 213) and elevation boundary (not shown). The azimuth boundary and elevation boundary may be based on a power level set by a transceiver in Si 202 and/or beamforming vectors that may be used to cause the transceiver to set power levels for each of two or more antennas attached to the transceiver to focus the azimuth boundary and elevation boundary in a predefined direction. Accordingly a sector (Sector 215) may be created within which devices may receive frames transmitted by S1 202. Sector 215 may comprise the entire area encompassing the azimuth and elevation boundary. As an example, S2 206 may be on the edge of Sector 215 and may detect RF electromagnetic transmissions from S1 202, and thus, may detect (overhear) RTS frame 203. S2 206 may overhear RTS frame 203 when it is in an omnidirectional receiver mode. Omnidirectional receiver mode may be a mode in which a transceiver, and in particular, the receiver of the transceiver, may receive physical layer convergence protocol data units (PPDUs) corresponding to one or more frames. When S2 206 overhears RTS 203 on the first designated channel, S2 206 may determine that S1 202 and D1 204 are using the first designated channel to transmit and receive frames. S2 206 may determine that S1 202 and D1 204 are using the first designated channel to transmit and receive frames because RTS frame 203 comprises a transmitter address field and receiver address field, wherein the transmitter address field includes the MAC address of S1 202 and the receiver address field includes the MAC address of D1 204. Accordingly, if S2 206 wants to transmit and/or receive frames to and/or from D2 208, S2 206 may establish a second link (for example, Link 209) with D2 208. In some embodiments, the second link may be established over a second designated channel, so as not to interfere with the first designated channel. In other embodiments, when S2 206 overhears RTS 203 or other frames from S1 202, S2 206 may set a CCA to busy, and may possibly set a NAV to expire after a predetermined period of time, for Sector 215, thereby blocking S2 206 from transmitting frames to D2 208 on the first designated channel.

NAV may be a virtual carrier sensing mechanism that may be used by devices to reserve a channel for mandatory frames that must follow the frame being transmitted. NAV may be a value in microseconds corresponding to the length of time that the channel may be reserved by the devices to transmit frames. For example, S2 206 may overhear RTS frame 203 and/or CTS frame 205 and in a MAC header duration field of the RTS frame 203 and/or CTS frame 205 the NAV may be included, so S2 206 may set a timer equal to the value in the NAV.

CCA may be comprised of a carrier sense (CS) and energy detection (ED) function. The CS function may enable a device receiving a frame to detect and decode incoming frame preambles. The CCA may report a busy indication to a higher layer (for example, network layer) for the length of time a frame is being received as indicated by the frames length field. When a header of a frame is decoded the CCA will report that the channel (medium) is busy for the time required for the frame transmission to complete.

The length field of the frame indicates either the number of microseconds required for transmission of the full frame payload, or the number of octects carried in the frame payload which is then used in combination with a rate field (which identifies the modulation used for the payload) to determine the time required for the frame to be transmitted. The length or rate and length fields give the receiver the information required to de-modulate the frame and determine how long the medium will be busy.

The ED function enables a device receiving a frame to detect when non 802.11 energy levels are present on a channel based on the noise floor, ambient energy, interference sources, and unidentifiable frames that may have been corrupted and can no longer be decoded. The ED function may sample the medium in each transmission time slot to determine if energy is detected. In addition, energy detection may require a predefined threshold which may be used to determine if the detected energy levels are adequate to indicate that the medium is busy or idle. This may be referred to as an ED threshold level or CCA sensitivity level. The ED threshold may be lower for valid 802.11 signals that can be decoded using carrier sensing as opposed to non 802.11 signals. For example, the noise ED threshold may be 20 dB greater than the corresponding 802.11 ED threshold for other physical layer noise floors (for example, Long Term Evolution (LTE) radio noise floor).

In order to prevent the blocking of S1 202 from transmitting frames to D2 208, in some embodiments, S2 206 may establish the second link over the first designated channel (that is the channel used between S1 202 and D1 204), which may be referred to as spatial frequency reuse, by applying beamforming vectors to transmitted frames so that the azimuth boundary (not shown) and/or elevation boundary (not shown) of RF electromagnetic waves associated with the frames transmitted by S2 206 do not overlap, or at least significantly overlap with RF boundary 213. For example, the azimuth boundary and/or elevation boundary of the RF electromagnetic waves associated with the frames transmitted by S2 206 may overlap by only a predetermined number of degrees or meters that will not degrade or perturb transmissions from S1 202 to D1 204 when S2 206 transmits frames to D2 208.

A highly concentrated RF electromagnetic wave (signal) may be transmitted by S2 206 in a predetermined direction to D2 208, that may minimize the interference experienced by devices in Sector 215 by transmitting the signal on one or more antennas, with different amplitudes and phases, so that the transmitted signals arrive constructively at the receiver of D2 208, and arrive destructively at the receiver of devices in Sector 215. Because the signals arrive at the receiver of the devices in Sector 215 destructively, the receiver of the devices in Sector 215 will treat the received signal as noise and may filter the received signals out and regard them as noise.

In order to determine the amplitudes and phases, portions of preambles comprising headers may be beamformed. In some embodiments, a frame may be stored in a memory of S2 206 as an array (vector), wherein each entry of the vector may correspond to a sample of a continuous RF electromagnetic signal generated by a processor (for example, hardware processor 802) executing computer-executable instructions that cause the processor to estimate (measure) a channel impulse response H(f). The vector may comprise real values and/or complex values. The dimensions of the vector may be based at least in part on the number of antennas associated with AP 102. As an example, S2 206 may be AP 102, and may have four antennas, and as a result the vector may comprise four entries resulting in a vector with four rows and one column. In general the vector may comprise M rows resulting in an M×1 vector, where M is any natural number. The beamformed vector may be determined based on the channel impulse response H(f). In particular, the channel impulse response H(f) may be decomposed into three matrices U(f), Σ(f), and V(f)*, wherein the columns of V(f)* are the beamforming vectors. The channel impulse response H(f) may be decomposed or factored using a singular value decomposition. For example, the channel impulse response H(f) may be a matrix with a 2×4 dimension where 2 is the number of antennas on D2 208 and 4 is the number of antennas on S2 206. Therefore the rows correspond to the antennas of D2 208 and the columns correspond to the antenna of S2 206. The frequency f corresponds to a single discrete frequency over which the channel impulse response is estimated between S2 206 and D2 208. Accordingly, each entry represents the channel impulse response between a given antenna on S2 206 and D2 208.

U(f) may be a 2×2 matrix comprising columns that are receiving beamforming vectors (eigenvectors of a matrix multiplication of H(f) and the conjugate transpose of H(f)). That is, the columns of U(f) may be the eigenvectors of H(f)H(f)*. In some embodiments, S2 206 and/or D2 208 may both know what the channel impulse response H(/) is, and thus may be able to determine the eigenvectors of H(f)H(f)*. The eigenvectors may be used by a device receiving a beamformed frame to recover the transmitted frame. For example, S2 206 may transmit a beamformed frame and D2 208 may determine what the frame is by performing a matrix multiplication of the received beamformed frame and the conjugate transpose of U(f) (U(f)*).

V(f)* may be a 4×4 matrix comprising columns that are transmitting beamforming vectors (eigenvectors of a matrix multiplication of H(f) and the conjugate transpose of H(f)). That is, the columns of V(f)* may be the eigenvectors of H(f)*H(f). As mentioned above, S2 206 and/or D2 208 may both know what the channel impulse response H(f) is, and thus may be able to determine the eigenvectors of H(f)*H(f). The eigenvectors may be used by a device transmitting a frame to beamform the frame. For example, S2 206 may perform a matrix multiplication of a frame and V(f)* to generate a beamformed vector. S2 206 may then transmit the beamformed vector.

As an example, S2 206 may determine that the first designated channel corresponds to a first group of frequencies over which if a frame were transmitted to D2 208 without beamforming the frame would result in destructively interfering (packet collisions) with transmissions by devices in Sector 215. Accordingly, S2 206 may determine the channel impulse response H(f) for the first group of frequencies and determine the transmitting beamforming vectors and multiply the transmitting beamforming vectors by the frame. As noted above the frame may be represented by a vector. For example, because S2 206 may have 4 antennas, the frame may be beamformed by 4 antennas and therefore may be a 4×1 vector and S2 206 may perform a matrix multiplication of V(f)* and the vector corresponding to the frame to generate a beamformed frame. D2 208 may receive the beamformed vector and may perform a matrix multiplication of U(f)* and the received beamformed vector to determine what the frame transmitted by S2 206.

S2 206 may determine the gain which in turn may determine the amplitude at which the frame will be transmitted on each antenna by determining the entries of Σ(f). Σ(f) may be a diagonal matrix of dimension 2×4, in the context of the example above, and the diagonal entries may be the only non-zero entries in Σ(f). Σ(f) may be the beamforming gain matrix and each column may correspond to the gain at which the frame may be transmitted from the transmitting device (for example, S2 206) to a corresponding antenna on the receiving device (for example, D2 208). As an example, because Σ(f) is a 2×4 matrix, only the first of the four S2 206 antennas and possibly the second of the four S2 206 antennas may have non-zero entries. Thus S2 206 may set a gain for the first and second antennas so that the beamformed vector will arrive on the first and second antennas of D2 208 with the gains in Σ(f) associated with the first and second antennas of S2 206. The phases of the beamformed vector may be determined by the transmitting beamforming vectors because they are complex value vectors, and therefore can be expressed in terms of phase and amplitude. In some embodiments, transmitting beamforming vectors and receiving beamforming vectors may be orthonormal, and therefore the amplitude of both the transmitting and receiving beamforming vectors may be equal to one, and therefore the complex number may represent the phase with unity amplitude. Thus the amplitude at which a beamformed vector may be transmitted may be determined by the gains in Σ(f) and the phase of the beamformed vector may be determined by the complex values of the transmitting beamforming vectors. For example, the complex values may be expressed as $z=x+iy$, where $(x, y)$ may be a point on a complex plane corresponding to where the RF electromagnetic wave of the corresponding antenna may combine constructively with RF electromagnetic waves from other antennas. The phase, θ, may be equal to the arc tangent of y divided by x and may be an angle between $z=x+iy$ and $z=x$. Returning the example, above a phase may be determined by S2 206 for each transmitting antenna, and may be used to transmit the beamformed vector across the 4 antennas such that the beamformed vector arrives constructively at D2 208 and destructively at a device in Sector 215.

In some embodiments, S1 202 may append N receiving training (TRN-R) fields to RTS 203 with, and D1 204 may append N receiving training (TRN-R) fields to CTS 205, where N is a natural number. The TRN-R fields may enable devices, in omnidirectional receiver mode, that receive RTS 203 and/or CTS 205 to determine the CCA associated with sectors that RTS 203 and CTS 205 are not received on. That is, devices that can overhear frames (for example, control frames such as the RTS and/or CTS frames) in one or more sectors, may check the CCA in the one or more sectors to determine if the CCA is idle in the one or more sectors. If the CCA is idle in the one or more sectors, then devices may use the second designated channel to transmit and receive frames to and from other devices in the one or more sectors using the beamforming techniques explained above. As an example, S2 206 may overhear RTS 203 and/or CTS 205 and may determine that a sector corresponding to the azimuth boundary and/or elevation boundary of RF electromagnetic waves associated with the frames transmitted by S2 206 to D2 208, using the beamforming techniques disclosed above, has an idle CCA and therefore may determine to transmit control frames (for example, RTS frames and/or CTS frames) or data frames to D2 208. Accordingly, S2 206 may set a NAV to busy for Sector 215, and may transmit beamformed frames to D2 208.

Figure 3:
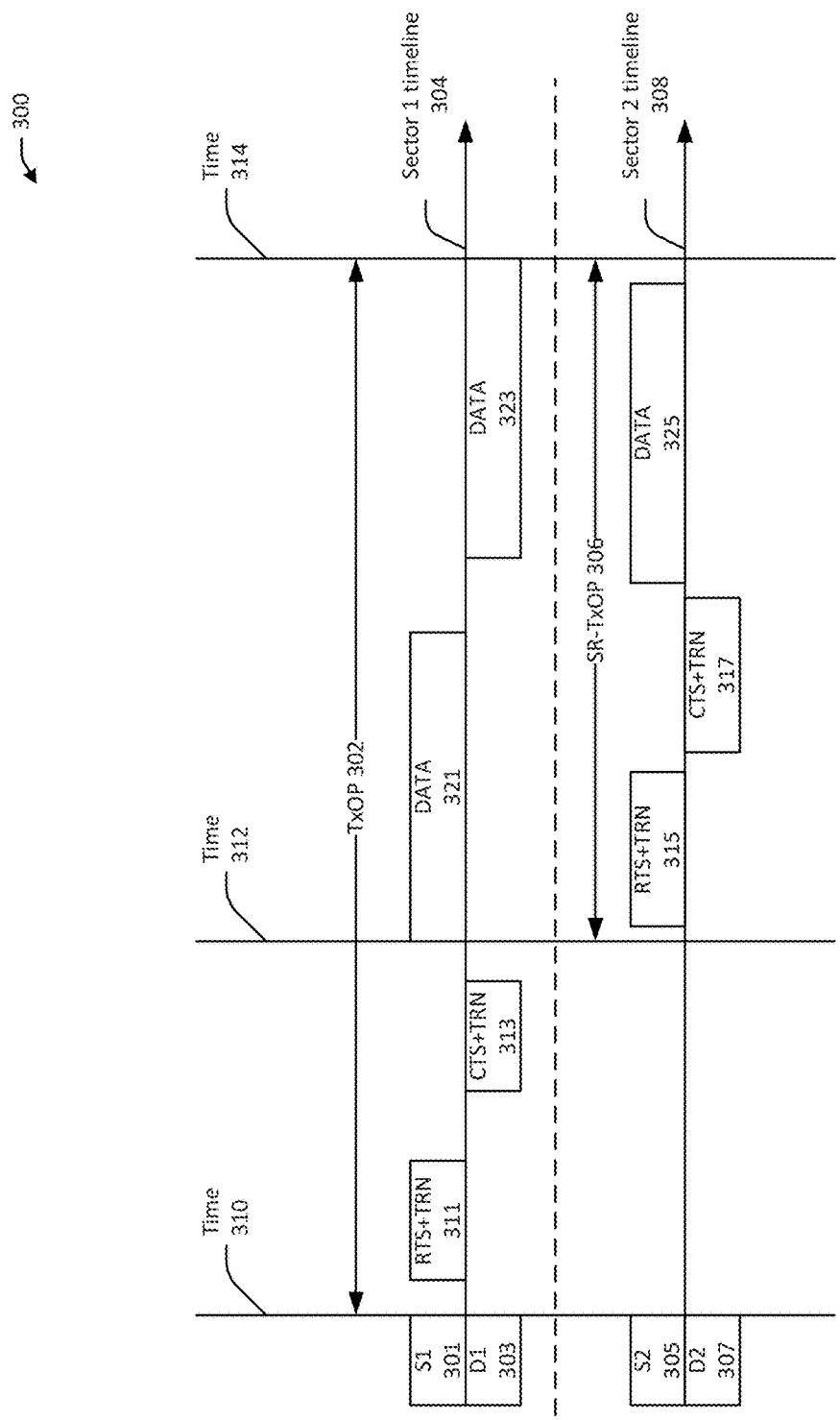
FIG. 3 depicts an illustrative channel access timing diagram, in accordance with one or more example embodiments of the present disclosure.

FIG. 3 depicts an illustrative channel access timing diagram, in accordance with one or more example embodiments of the present disclosure. As mentioned above, spatial reuse can be used by S2 206 and D2 208 to establish a second link (for example, Link 209) using the first designated channel, however S2 206 and D2 208 may be limited to a predetermined period of time over which control frames and data frames may be transmitted. S1 301 and D1 303 may be in a first sector (for example, Sector 215 in FIG. 2) and a timeline indicating the exchange of control and data frames may be indicated by sector 1 timeline 304. S2 305 and D2 307 may be in a second sector and a timeline indicating the exchange of control and data frames may be indicated by sector 2 timeline 308. For example, S1 301 and D1 303 may establish a transmission opportunity (TxOP) period (for example, TxOP 302) which may be an interval of time during which S1 301 or D1 303 has a right to transmit frames to other devices. The TxOP period may be defined by a starting time and a maximum duration time. Thus TxOP 302 may last from time 310 (starting time) to time 314 (maximum of duration time after time 310). During TxOP 302, S1 301 may transmit a RTS frame appended with at least one TRN-R field (for example, RTS+TRN 311) and D1 303 may respond to S1 301 by transmitting CTS+TRN 313 in response to RTS+TRN 311. The exchange of RTS+TRN 311 and CTS+TRN 313 may establish a link between S1 301 and D1 303 (similar to link 207 between S1 and D1 in FIG. 2). After the link is established S1 301 and D1 303 may transmit data frames (for example, Data 321 and Data 323) to each other between time 312 and time 314. The period of time between time 312 and time 314 may be referred to as a spatial reuse (SR) transmission opportunity (TxOP) period (for example, SR-TxOP 306). During SR-TxOP 306, S1 301 and D1 303 may transmit control and data frames using the first designated channel using at least two beamforming vectors. In particular, S2 305 may transmit a RTS frame appended with at least one TRN-R field (for example, RTS+TRN 315) and D2 307 may respond to S2 305 by transmitting CTS+TRN 317 in response to receiving RTS+TRN 315. The exchange of RTS+TRN 315 and CTS+TRN 317 may establish a link between S2 305 and D2 307 (similar to link 209 between S2 and D2 in FIG. 2). After the link is established, S2 305 may transmit data frames (for example, Data 325) to D2 307 during SR-TxOP 306. In some embodiments SR-TxOP 306 may not exceed TxOP 302, that is, extend in time past the end of TxOP 302, but in other embodiments SR-TxOP 306 may exceed TxOP 302 as explained below.

Figure 4:
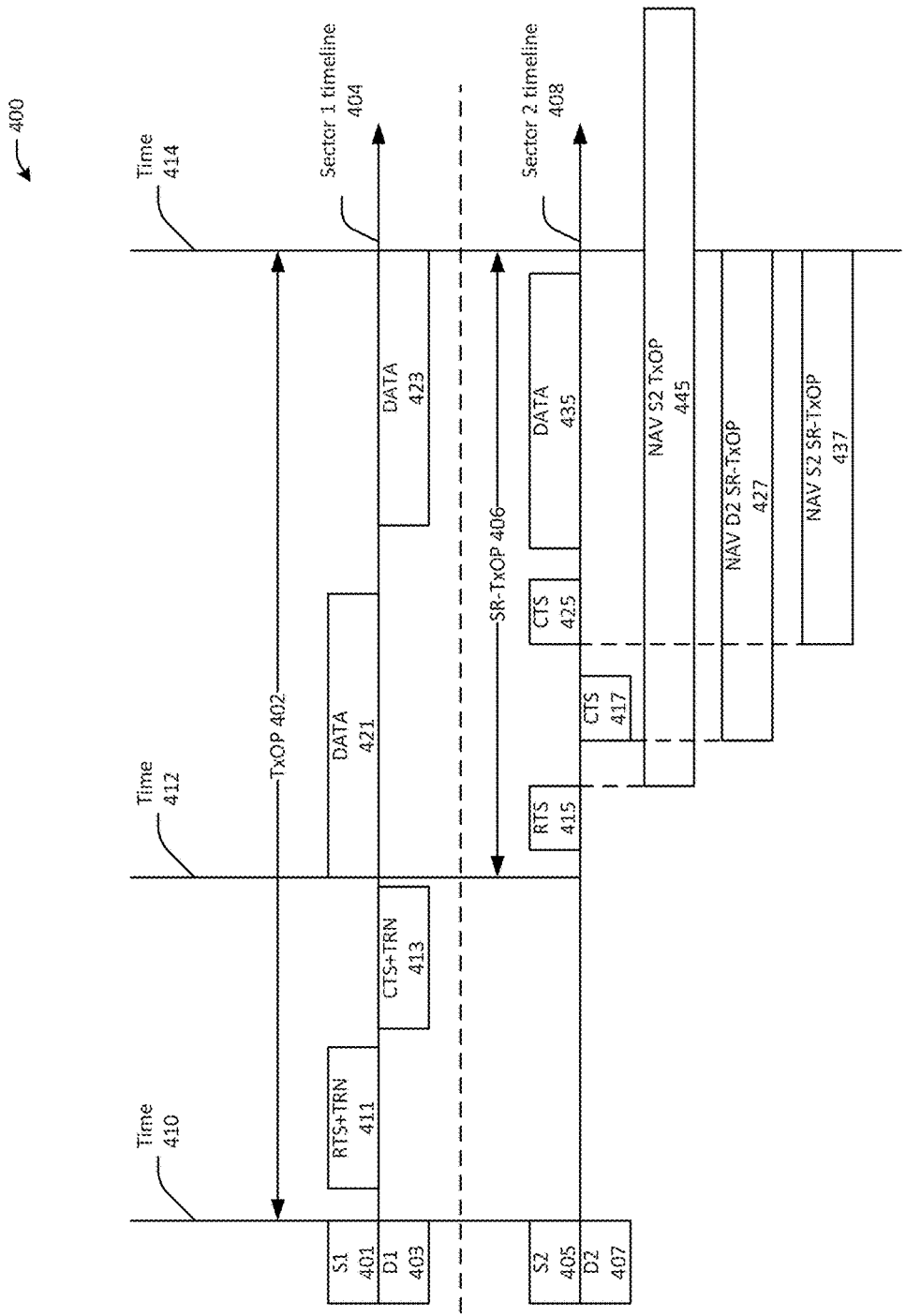
FIG. 4 depicts an illustrative channel access timing diagram, in accordance with one or more example embodiments of the present disclosure.

FIG. 4 depicts an illustrative channel access timing diagram, in accordance with one or more example embodiments of the present disclosure. In some embodiments the SR-TxOP period may exceed the TxOP period, even though the SR-TxOP period has been established between two devices. In particular, the SR-TxOP may exceed the TxOP period when a first device of two devices is operating in a spatial reuse mode and a second device is not operating in a spatial reuse mode. That is, the first device may transmit to the second device or receive frames from the second device on a first channel (a channel used in a first sector by other devices), but the second device may not transmit to the first device or receive frames from the first device on the first channel. Because the SR-TxOP has been established between the two devices, even though only one device is reusing the first channel, and where the SR-TxOP period is limited by the TxOP period, a limited amount of time may be available to transmit and receive frames. The second device, which is not operating in the spatial reuse mode may extend the SR-TxOP period by transmitting a NAV in a RTS frame, corresponding to a second TxOP period, to the first device, which is operating in the spatial reuse mode. The NAV may indicate the amount of time after the SR-TxOP period that the channel medium may be reserved to transmit to and/or receive frames from the device operating in the spatial reuse mode. This may be done to increase the amount of time during which the device that is in spatial reuse mode and the device that is not in spatial reuse mode may spend sending and receiving data frames.

S1 401, D1 403, S2 405, D2 407 may be a device (e.g., AP 102 or user device 128). Time 410, may be a start time of TxOP 402, Time 412 may be a start time of SR-TxOP 406, and Time 414 may be the end of TxOP 402 and SR-TxOP 406. Sector 1 timeline 404 may be a timeline corresponding to times during which S1 401 and D1 403 may transmit and receive control frames and data frames. Sector 2 timeline 408 may be a timeline corresponding to times during which S2 405 and D2 407 may transmit and receive control frames and data frames. RTS+TRN 411 may be a RTS frame appended with a TRN field. CTS+TRN 413 may be a CTS frame appended with a TRN field. RTS 415 may be a RTS frame, CTS 417 may be a CTS frame, DATA 421, 423, and 435 may be data frames. CTS 425 may be a CTS-to-self frame. NAV S2 TxOP 445, NAV D2 SR-TxOP 427, NAV S2 SR-TxOP 437 may be NAVs.

For example, S2 405 and D2 407 may begin a procedure of establishing a link between themselves after time 412, and because the SR-TxOP period (for example, SR-TxOP 406) ends at time 414, S2 405 may be limited to transmitting one data frame (for example, Data 435), as compared to two or more data frames (for example, Data 421 and Data 423) transmitted by S1 401. Accordingly, S2 405, which for illustrative purposes is not operating in the spatial reuse mode may transmit RTS frame 415 with a NAV (for example, NAV S2 TxOP 445), in the header of RTS frame 415, to D2 407, which for illustrative purposes is operating in spatial reuse mode indicating that the SR-TxOP period (for example, SR-TxOP 406) may be extended to end when NAV S2 TxOP 445 ends.

S1 401 and D1 403 may establish a transmission opportunity (TxOP) period (for example, TxOP 402) which may be an interval of time during which S1 401 or D1 403 has a right to transmit frames to other devices. The TxOP period may be defined by a starting time and a maximum duration time. Thus TxOP 402 may last from time 410 (starting time) to time 414 (maximum duration time). During TxOP 402 S1 401 may transmit a RTS frame appended with at least one TRN-R field (for example, RTS+TRN 411) and D1 403 may respond to S1 401 by transmitting CTS+TRN 413 in response to RTS+TRN 411 to receiving. The exchange of RTS+TRN 411 and CTS+TRN 413 may establish a link (for example, Link 207) between S1 401 and D1 403. After the link is established S1 401 and D1 403 may transmit data frames (for example, Data 421 and Data 423) to each other between time 412 and time 414. The period of time between time 412 and time 414 may be referred to as the spatial reuse (SR) transmission opportunity (TxOP) period (for example, SR-TxOP 406). During SR-TxOP 406 devices may transmit control and data frames using the first designated channel using at least two beamforming vectors. In particular, S2 405 may transmit a RTS frame comprising a first NAV (for example, NAV S2 TxOP 445) and D2 407 may respond to S2 405 by transmitting a CTS frame comprising a second NAV (for example NAV D2 SR-TxOP 427), indicating how long D2 407 will not transmit any frames so that it may receive frames from S2 405. NAV D2 SR-TxOP may end at time 414 when SR-TxOP 406 ends. S2 405 may send a CTS frame to itself, which may be referred to as a CTS-to-self frame. The CTS-to-self frame (for example, CTS 425) is a CTS frame in which the RA field is equal to the transmitting device's MAC address. CTS 425 may comprise a third NAV (for example, NAV S2 SR-TxOP 437) confirming when SR-TxOP 406 ends. S1 401 and D1 403 may be in a first sector (for example, Sector 215) and a timeline indicating the exchange of control and data frames may be indicated by Sector 1 timeline 404. S2 405 and D2 407 may be in a second sector and a timeline indicating the exchange of control and data frames may be indicated by Sector 2 timeline 408.

Figure 5:
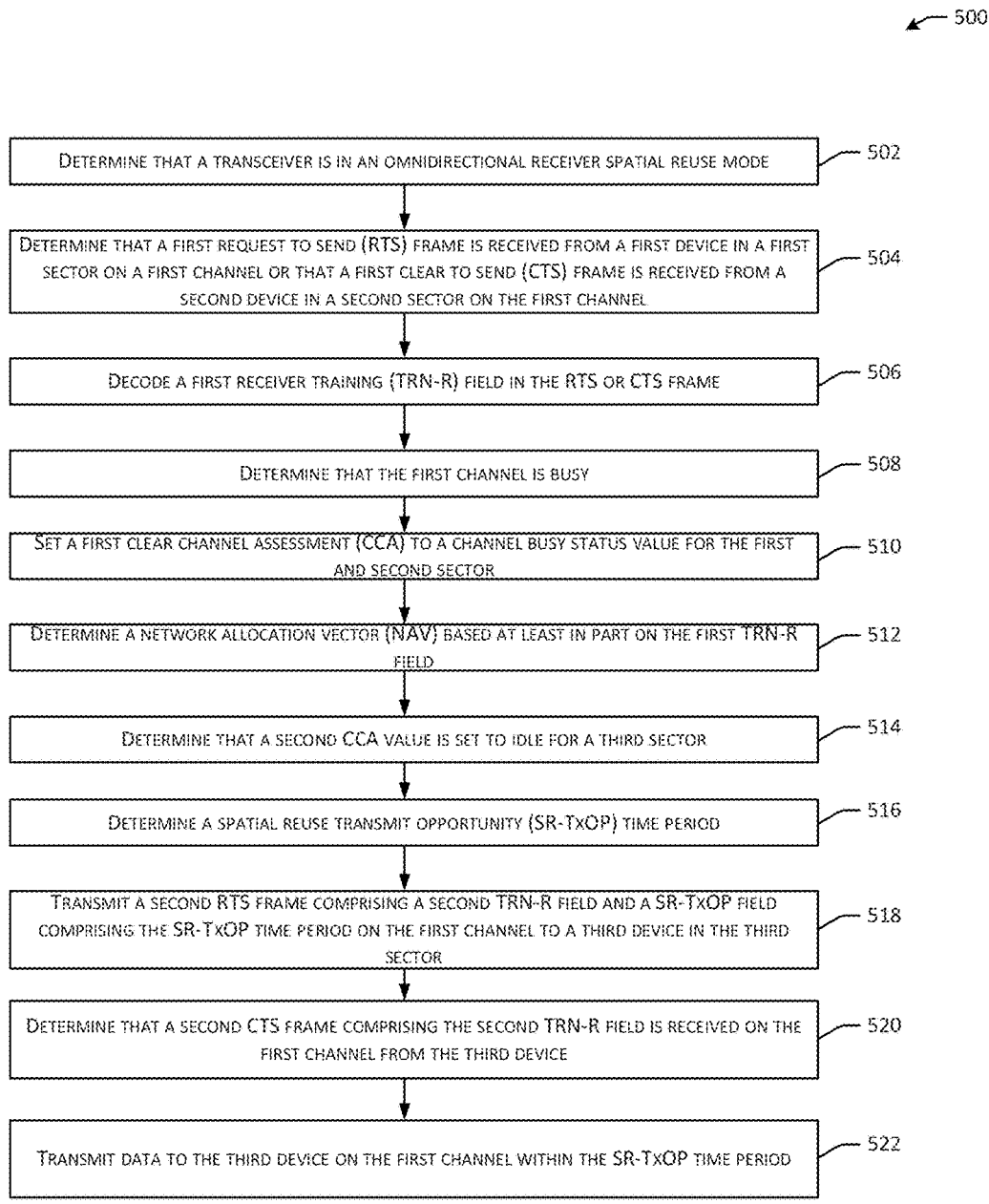
FIG. 5 depicts a flow diagram of an illustrative process for establishing a spatial reuse channel, in accordance with one or more embodiments of the disclosure.

FIG. 5 depicts a flow diagram of an illustrative process for establishing a spatial reuse channel, in accordance with one or more embodiments of the disclosure. In step 502, a first device (for example, AP 102) may determine that a transceiver in the device is configured in an omnidirectional receiver spatial reuse mode. After determining the configuration of the transceiver the device may determine that a first request to send (RTS) frame is received from a first device in a first sector (for example, Sector 215) on a first designated channel or that a first clear to send (CTS) frame is received from a second device in a second sector on the first channel (step 504). For example, S1 206 may receive RTS 203 from S1 202 in Sector 215 and may receive CTS 205 from D1 204 in another sector (not shown). In some embodiments, a device (for example, S2 206) may receive control frames (for example, RTSs and CTSs) from devices corresponding to different sectors. For example, S2 206 may be located in a physical area comprising a plurality of intersecting sectors and thus may receive control frames from one or more devices in each of the plurality of intersecting sectors.

In step 506, the device may decode a first receiver training (TRN-R) field in the RTS or CTS frame. The TRN-R fields may enable the device (for example, S2 206), in omnidirectional receiver mode, that receive RTS 203 and/or CTS 205 to determine the CCA associated with sectors that RTS 203 and CTS 205 are not received on. For example, S2 206 may receive a RTS or CTS from a device not in Sector 215, or a sector (not shown) corresponding to the transmission of CTS 205 from D1 204. S2 206 may overhear frames (for example, control frames) in one or more sectors, may check the CCA in the one or more sectors to determine if the CCA is idle in the one or more sectors, and if the CCA is idle in the one or more sectors, S2 206 may transmit and receive frames to and from other devices in the one or more sectors, on the first designated channel, using the beamforming techniques explained above. As an example, S2 206 may overhear RTS 203 and/or CTS 205 and may determine that a sector corresponding to the azimuth boundary and/or elevation boundary of RF electromagnetic waves associated with the frames transmitted by S2 206 to D2 208 has an idle CCA and therefore, may determine to transmit control frames (for example, RTS frames and/or CTS frames) or data frames to D2 208. Accordingly, S2 206 may set a NAV to busy for Sector 215, and may transmit beamformed frames to D2 208.

In step 508, the device may determine that the first designated channel is busy. For example, S2 206 may overhear RTS 203 or CTS 205 and may determine that the first designated channel is busy. In step 510, the device may set a first clear channel assessment (CCA) to a channel busy status value for the first and second sector, corresponding to the first designated channel. In some embodiments, there may be a plurality of sectors that the device may set a corresponding CCA to a channel busy status.

In step 512, the device may determine a network allocation vector (NAV) based at least in part on the first TRN-R field. For example, S2 206 may overhear RTS frame 203 and/or CTS frame 205 and in a MAC header duration field of the RTS frame 203 and/or CTS frame 205 the NAV may be included, so S2 206 may set a timer equal to the value in the NAV.

In step 514, the device may determine that a second CCA value is set to idle for a third sector, as explained above by overhearing RTS frames or CTS frames. Because the second CCA value is set to idle for the third sector, the device may transmit and receive frames to and from devices in the third sector, using beamforming, on the first designated channel. Accordingly, the device may determine a spatial reuse transmit opportunity (SR-TxOP) time period within which to transmit control frames and/or data frames to and from the devices in the third sector (step 516).

In step 518, the device may transmit a second RTS frame comprising a second TRN-R field and a SR-TxOP field comprising the SR-TxOP time period on the first designated channel to a third device in the third sector. For example, S2 206 may transmit the second RTS frame to D2 208. In step 520, the device may determine that a second CTS frame comprising the second TRN-R field is received on the first designated channel from the third device. In step 522, the device may transmit at least one data frame to the third device, on the first designated channel, within the SR-TxOP time period. The method may end after step 522.

Figure 6:
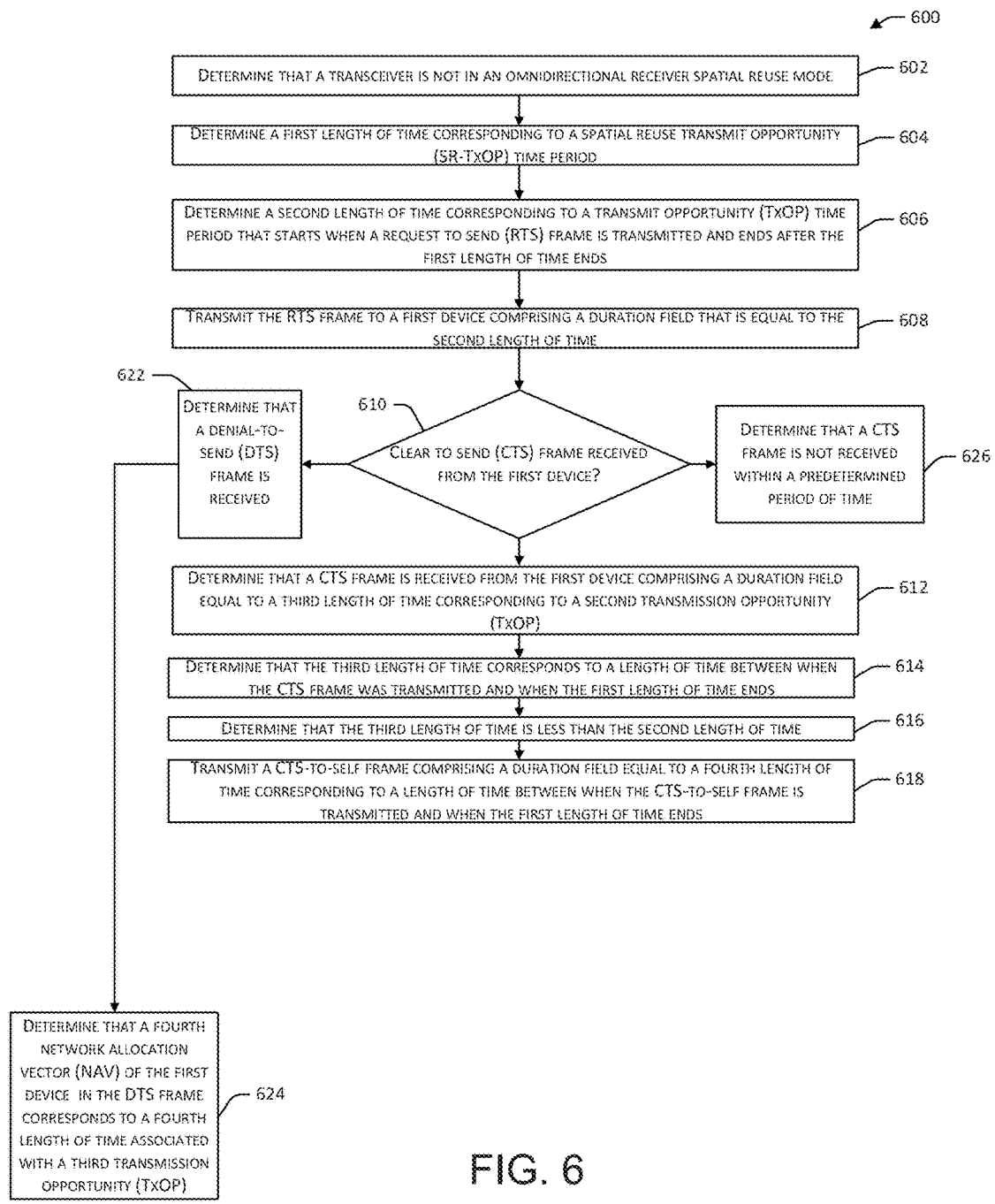
FIG. 6 depicts a flow diagram of an illustrative process for establishing a spatial reuse channel, in accordance with one or more embodiments of the disclosure.

FIG. 6 depicts a flow diagram of an illustrative process for establishing a spatial reuse channel, in accordance with one or more embodiments of the disclosure. In step 602, the device may determine that a transceiver is not in an omni-directional receiver spatial reuse mode. In step 604, the device may determine a first length of time corresponding to a spatial reuse transmit opportunity (SR-TxOP) time period. The SR-TxOP time period may be based on a predetermined period of time corresponding to when data frames may be overheard from other devices. For example, S2 405 may determine that S1 401 transmitted Data 421 and may determine, based on a timestamp in Data 421, that the SR-TxOP time period may be the difference between time 414 and time 412. That is, time 412 may correspond to a timestamp associated with when Data 412 is transmitted, and based on time 412 S2 405 may determine time 414 based on a predetermined time that may be preprogrammed into S2 405.

In step 606, the device may determine a second length of time corresponding to a transmit opportunity (TxOP) time period that starts when a request to send (RTS) frame is transmitted and ends after the first length of time ends. The second length of time may be based on the number of data frames the device may have to send to one or more devices. For instance, S2 405 may correspond to AP 102, and may have 50 data frames to transmit to D2 407 which may correspond to user device 128, and may determine that the 50 data frames may require a time period that is greater than the first length of time. For example, S2 405 may determine that 1 data frame may be transmitted during SR-TxOP 406, but that the remaining 49 data frames must be transmitted after SR-TxOP, and thus may determine that the second length of time should correspond to NAV S2 TxOP 445.

In step 608, the device may transmit the RTS frame to a first device comprising a duration field that is equal to the second length of time. Returning to the example above, S2 405 the second length of time may be equal to NAV S2 TxOP 445 and may be selected based, at least in part on, the 50 data frames to be transmitted to D2 407.

In step 610, the device may determine whether a clear to send (CTS) frame is received from the first device. In step 612, the device may determine that a CTS frame is received from the first device comprising a duration field equal to a third length of time corresponding to a spatial reuse transmission opportunity (SR-TxOP) time period. The duration field, may be a spatial reuse duration field corresponding to a period of time over which the first device may use spatial reuse to receive control frames and/or data frames. For example, S2 405 may determine that it has received CTS 417 from D2 407 and may determine that it should set a NAV to be equal to the duration field comprising the third length of time (for example, NAV D2 SR-TxOP 427). The third length of time may be based at least in part on the first device's transceiver being configured to operate in an omni-directional spatial reuse mode. For example, D2 407 may overhear RTS+TRN 411 and/or CTS+TRN 413 and determine SR-TxOP 406 and set a NAV to SR-TxOP 406 and consequently, when S2 405 receives CTS 417 the duration field may be equal to NAV D2 SR-TxOP 427 which may be equal to the difference between the end of SR-TxOP 406 (for example, time 414) and a timestamp corresponding to when CTS 417 is transmitted.

In step 614, the device may determine that the third length of time corresponds to a length of time between when the CTS frame was transmitted and when the first length of time ends. For instance, the device (for example, S2 405) may determine that the third length of time is equal to the difference between the end of SR-TxOP 406 (for example, time 414) and the time when CTS 417 was transmitted. This is difference is equal to NAV D2 SR-TxOP 427.

In step 616, the device may determine that the third length of time is less than the second length of time. In step 618, the device may transmit a CTS-to-self frame comprising a duration field equal to a fourth length of time corresponding to a length of time between when the CTS-to-self frame is transmitted and when the first length of time ends. For example, S2 405 may transmit CTS 425, which may be a CTS-to-self frame, to S2 405 (itself) and CTS 425 may comprise a duration field corresponding to NAV S2 SR-TxOP 437, which may be equal to the difference in time between time 414 and a time when CTS 425 is transmitted.

In some embodiments, if the device does not receive a CTS frame, in step 610, the device may determine that a denial to send (DTS) frame is received from the first device (step 622). After receiving a DTS frame, in step 624 the device may determine that a fourth network allocation vector (NAV) of the first device in the DTS frame corresponds to a fourth length of time associated with a third transmission (TxOP). The DTS frame may comprise, among other fields, a duration field that may be equal to the fourth length of time, which may be associated with a NAV of the first device. The NAV may be equal to the sum of the amount of time required to transmit the DTS frame and a short interframe space (SIFS) period, or the remaining time in an SP at the end of the DTS frame. In some embodiments, the smaller of the remaining time, and the sum of the amount of time required to transmit the DTS frame and a SIFS period may be recorded as the NAV.

In other embodiments, if the device does not receive a CTS in step 610, the device may determine that a CTS frame is not received within a predetermined period of time (step 626). The method may end after step 610.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2-6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (for example, a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (for example, a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (for example, a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (for example, methodologies) discussed herein may be performed. In other embodiments, the machine 800 may operate as a standalone device or may be connected (for example, networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (for example, hardware) capable of performing specified operations when operating. A module includes hardware. In an example, the hardware may be specifically configured to carry out a specific operation (for example, hardwired). In another example, the hardware may include configurable execution units (for example, transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (for example, computer system) 800 may include a hardware processor 802 (for example, a central processing unit (CPU), a graphics processing unit (GPU), a hardware processor core, or any combination thereof), a main memory 804 and a static memory 806, some or all of which may communicate with each other via an interlink (for example, bus) 808. The machine 800 may further include a power management device 832, a graphics display device 810, an alphanumeric input device 812 (for example, a keyboard), and a user interface (UI) navigation device 814 (for example, a mouse). In an example, the graphics display device 810, alphanumeric input device 812, and UI navigation device 814 may be a touch screen display. The machine 800 may additionally include a storage device (i.e., drive unit) 816, a signal generation device 818 (for example, a speaker), a network interface device/transceiver 820 coupled to antenna(s) 830, and one or more sensors 828, such as a global positioning system (GPS) sensor, compass, accelerometer, or other sensor. The machine 800 may include an output controller 834, such as a serial (for example, universal serial bus (USB), parallel, or other wired or wireless (for example, infrared (IR), near field communication (NFC), etc.) connection to communicate with or control one or more peripheral devices (for example, a printer, card reader, etc.)).

The storage device 816 may include a machine readable medium 822 on which is stored one or more sets of data structures or instructions 824 (for example, software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The instructions 824 may carry out or perform any of the operations and processes (for example, processes 500 and 600) described and shown above. While the machine-readable medium 822 is illustrated as a single medium, the term "machine-readable medium" may include a single medium or multiple media (for example, a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (for example, Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (for example, frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (for example, the Internet), mobile telephone networks (for example, cellular networks), Plain Old Telephone (POTS) networks, wireless data networks (for example, Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (for example, Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes (for example, processes 600 and 700)

described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, for example, a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), time-Division Multiplexing (TDM), time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

In example embodiments of the disclosure, there may be a device, comprising a memory and processing circuitry configured to: determine a first length of time corresponding to a first spatial reuse transmit opportunity (SR-TxOP) time period; determine a second length of time corresponding to a transmit opportunity (TxOP) time period that starts when a request to send (RTS) frame is transmitted and ends after the first length of time ends; cause to transmit the RTS frame, over a channel, to a first device; determine that a clear to send (CTS) frame is received from the first device, the CTS frame comprising a first duration field having a third length of time corresponding to a second (SR-TxOP); determine that the third length of time corresponds to a length of time between when the CTS frame was transmitted and when the first length of time ends; determine that the third length of time is less than the second length of time; cause to transmit a CTS to self frame, over the channel, comprising a second duration field having a fourth length of time, wherein the fourth length of time corresponds to a length of time between when the CTS to self frame is transmitted and when the first length of time ends.

Implementations may include the following features. The at least one processor of the one or more processors may be further configured to execute the computer-executable instructions to: transmit at least one data frame during the first SR-TxOP time period. The processing circuitry is further configured to: cause to transmit the CTS to self frame a first short inter-frame space (SIFS) period after the CTS frame is received. The processing circuitry is further configured to: determine a clear channel assessment (CCA) based at least in part on sensing a carrier signal associated with the CTS frame, or detecting energy associated with the carrier signal of the CTS frame. The processing circuitry is further configured to: cause to transmit at least one data frame to the first device after the first SR-TxOP time period ends. The processing circuitry is further configured to: determine a number of data frames to be sent to the second device, and wherein the second length of time is based at least in part the number of data frames.

The wireless device may further comprise a transceiver, and an antenna coupled to the transceiver, configured to transmit and receive wireless signals.

In some example embodiments of the disclosure, there may be a non-transitory computer-readable medium storing computer-executable instructions which, when executed by a processor, cause the processor to perform operations comprising: determining a first length of time corresponding to a first spatial reuse transmit opportunity (SR-TxOP) time period; determining a second length of time corresponding to a transmit opportunity (TxOP) time period that starts when a request to send (RTS) frame is transmitted and ends after the first length of time ends; causing to transmit the RTS frame, over a channel, to a first device; determining that a clear to send (CTS) frame is received from the first device, the CTS frame comprising a first duration field having a third length of time corresponding to a second (SR-TxOP); determining that the third length of time corresponds to a length of time between when the CTS frame was transmitted and when the first length of time ends; determining that the third length of time is less than the second length of time; causing to transmit a CTS to self frame, over the channel, comprising a second duration field having a fourth length of time, wherein the fourth length of time corresponds to a length of time between when the CTS to self frame is transmitted and when the first length of time ends.

Implementations may include the following features. The processor may execute further computer-executable instructions that cause the processor to perform operations comprising: transmitting at least one data frame during the first SR-TxOP time period. The processor may execute further computer-executable instructions that cause the processor to perform operations comprising: transmitting the CTS to self frame a first short inter-frame space (SIFS) period after the CTS frame is received. There may be a timestamp of the CTS frame that corresponds to a second time that is a second SIFS period after the RTS frame is transmitted. The processor may execute further computer-executable instructions that cause the processor to perform operations comprising: determining a clear channel assessment (CCA) based at least in part on sensing a carrier signal associated with the CTS frame, or detecting energy associated with the carrier signal of the CTS frame. The processor may execute further computer-executable instructions that cause the processor to perform operations comprising: transmitting at least one data frame to the first device after the first SR-TxOP time period ends. The processor may execute further computer-executable instructions that cause the processor to perform operations comprising: determining a number of data frames to be sent to the second device, and wherein the second length of time is based at least in part on the number of data frames.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising:
   memory and processing circuitry configured to:
   determine a first length of time corresponding to a first spatial reuse transmit opportunity (SR-TxOP) time period;
   determine a second length of time corresponding to a transmit opportunity (TxOP) time period that starts when a request to send (RTS) frame is transmitted and ends after the first length of time ends;
   cause to transmit the RTS frame, over a channel, to a first device;
   determine that a clear to send (CTS) frame is received from the first device, the CTS frame comprising a first duration field having a third length of time corresponding to a second (SR-TxOP);
   determine that the third length of time corresponds to a length of time between when the CTS frame was transmitted and when the first length of time ends;
   determine that the third length of time is less than the second length of time;
   cause to transmit a CTS to self frame, over the channel, comprising a second duration field having a fourth length of time, wherein the fourth length of time corresponds to a length of time between when the CTS to self frame is transmitted and when the first length of time ends.

2. The device of claim 1, wherein the processing circuitry is further configured to:
   transmit at least one data frame during the first SR-TxOP time period.

3. The wireless device of claim 1, wherein the processing circuitry is further configured to:
   cause to transmit the CTS to self frame a first short inter-frame space (SIFS) period after the CTS frame is received.

4. The wireless device of claim 1, wherein a timestamp of the CTS frame corresponds to a second time that is a second SIFS period after the RTS frame is transmitted.

5. The wireless device of claim 1, wherein the processing circuitry is further configured to:
   determine a clear channel assessment (CCA) based at least in part on sensing a carrier signal associated with the CTS frame, or detecting energy associated with the carrier signal of the CTS frame.

6. The wireless device of claim 1, wherein the processing circuitry is further configured to:
   cause to transmit at least one data frame to the first device after the first SR-TxOP time period ends.

7. The wireless device of claim 6, wherein the processing circuitry is further configured to:
   determine a number of data frames to be sent to the second device, and wherein the second length of time is based at least in part the number of data frames.

8. The wireless device of claim 1, further comprising a transceiver configured to transmit and receive wireless signals.

9. The wireless device of claim 8, further comprising an antenna coupled to the transceiver.

10. A non-transitory computer-readable medium storing computer-executable instructions which, when executed by a processor, cause the processor to perform operations comprising:
    determining a first length of time corresponding to a first spatial reuse transmit opportunity (SR-TxOP) time period;
    determining a second length of time corresponding to a transmit opportunity (TxOP) time period that starts when a request to send (RTS) frame is transmitted and ends after the first length of time ends;
    causing to transmit the RTS frame, over a channel, to a first device;
    determining that a clear to send (CTS) frame is received from the first device, the CTS frame comprising a first duration field having a third length of time corresponding to a second (SR-TxOP);
    determining that the third length of time corresponds to a length of time between when the CTS frame was transmitted and when the first length of time ends;
    determining that the third length of time is less than the second length of time;
    causing to transmit a CTS to self frame, over the channel, comprising a second duration field having a fourth length of time, wherein the fourth length of time correspond to a length of time between when the CTS to self frame is transmitted and when the first length of time ends.

11. The non-transitory computer-readable medium of claim 10, wherein the computer-executable instructions cause the processor to perform operations further comprising:
   transmitting at least one data frame during the first SR-TxOP time period.

12. The non-transitory computer-readable medium of claim 10, wherein the computer-executable instructions cause the processor to perform operations further comprising:
   transmitting the CTS to self frame a first short inter-frame space (SIFS) period after the CTS frame is received.

13. The non-transitory computer-readable medium of claim 10, wherein a timestamp of the CTS frame corresponds to a second time that is a second SIFS period after the RTS frame is transmitted.

14. The non-transitory computer-readable medium of claim 10, wherein the computer-executable instructions cause the processor to perform operations further comprising:
   determining a clear channel assessment (CCA) based at least in part on sensing a carrier signal associated with the CTS frame, or detecting energy associated with the carrier signal of the CTS frame.

15. The non-transitory computer-readable medium of claim 14, wherein the computer-executable instructions cause the processor to perform operations further comprising:
   transmitting at least one data frame to the first device after the first SR-TxOP time period ends.

16. The non-transitory computer-readable medium of claim 10, wherein the computer-executable instructions cause the processor to perform operations further comprising:
   determining a number of data frames to be sent to the second device, and wherein the second length of time is based at least in part the number of data frames.

17. A method comprising:
   determining a first length of time corresponding to a first spatial reuse transmit opportunity (SR-TxOP) time period;
   determining a second length of time corresponding to a transmit opportunity (TxOP) time period that starts when a request to send (RTS) frame is transmitted and ends after the first length of time ends;
   causing to transmit the RTS frame, over a channel, to a first device;
   determining that a clear to send (CTS) frame is received from the first device, the CTS frame comprising a first duration field having a third length of time corresponding to a second (SR-TxOP);
   determining that the third length of time corresponds to a length of time between when the CTS frame was transmitted and when the first length of time ends;
   determining that the third length of time is less than the second length of time;
   causing to transmit a CTS to self frame, over the channel, comprising a second duration field having a fourth length of time, wherein the fourth length of time correspond to a length of time between when the CTS to self frame is transmitted and when the first length of time ends.

18. The method of claim 17, further comprising:
   transmitting at least one data frame during the first SR-TxOP time period.

19. The method of claim 17, further comprising:
   transmitting the CTS to self frame a first short inter-frame space (SIFS) period after the CTS frame is received.

20. The method of claim 17, wherein a timestamp of the CTS frame corresponds to a second time that is a second SIFS period after the RTS frame is transmitted.

* * * * *